United States Patent [19]
Vlnaty

[11] 3,776,533
[45] Dec. 4, 1973

[54] APPARATUS FOR CONTINUOUS HEAT PROCESSING OF ORE PELLETS

[75] Inventor: Joseph Vlnaty, Aliquippa, Pa.

[73] Assignee: Dravo Corporation, Pittsburgh, Pa.

[22] Filed: Jan. 28, 1970

[21] Appl. No.: 6,433

[52] U.S. Cl............................ 266/24, 75/3, 75/9, 75/26
[51] Int. Cl............................................ C21b 13/14
[58] Field of Search.................... 75/3, 4, 9, 26, 34, 75/6, 1; 266/24; 18/20

[56] References Cited
UNITED STATES PATENTS

| | | | |
|---|---|---|---|
| 3,094,409 | 6/1963 | Renzoni | 75/9 |
| 2,874,480 | 2/1959 | Todd | 75/26 |
| 3,311,466 | 3/1967 | Curlook | 75/26 |
| 2,848,316 | 8/1958 | Davis | 75/26 |
| 2,129,760 | 9/1938 | Greenawalt | 75/8 |
| 2,864,686 | 12/1958 | Agarwal | 75/3 |
| 3,490,895 | 1/1970 | Svensson | 75/3 |
| 2,894,831 | 8/1961 | Old | 266/24 |
| 3,028,231 | 4/1962 | Klemantaski | 266/24 |
| 3,356,488 | 12/1967 | Walsh | 75/26 |
| 3,495,971 | 2/1970 | Ban | 75/3 |
| 3,160,496 | 12/1964 | Vaccari | 75/6 |
| 3,539,336 | 11/1970 | Urich | 75/3 |
| 3,172,757 | 3/1965 | Hess | 75/68 |
| 3,005,701 | 10/1961 | Eberhardt | 75/34 |
| 3,043,652 | 7/1962 | Schytil | 18/20 |

Primary Examiner—L. Dewayne Rutledge
Assistant Examiner—Peter D. Rosenberg
Attorney—Parmelee, Utzler and Welsh

[57] ABSTRACT

Apparatus and method for preheating, hardening and reducing ore pellets that provide for envelopment of the pellets in inert particulate material throughout the processing. Green pellets are continuously charged into a fluidized bed of heated particulate material and preheated while being buoyantly moved to a second fluidized bed. The preheated pellets are then buoyantly transported through the second fluidized bed of particulate material, which is at a higher temperature than the first bed, while being hardened. Hardened pellets are directly discharged from the second bed to the upper region of a columnar reactor for random envelopment within a bed of inert particulate material that is heated to a temperature sufficient to reduce the pellets during downward movement through the reactor.

9 Claims, 1 Drawing Figure

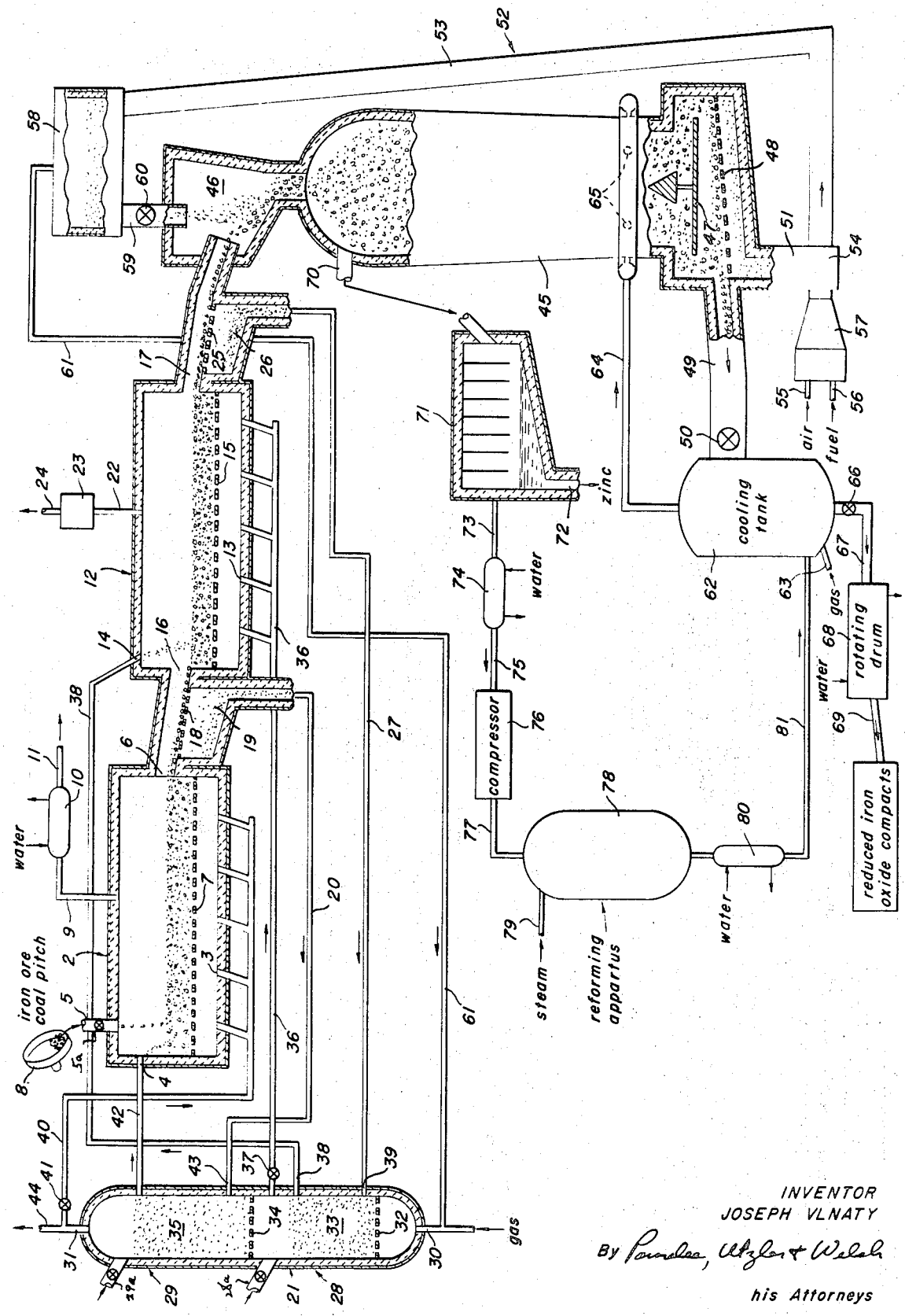

APPARATUS FOR CONTINUOUS HEAT PROCESSING OF ORE PELLETS

BACKGROUND OF THE INVENTION

It is known to produce compacts such as pellets or briquettes from iron ore and a solid reducing agent and to directly reduce the compacts while in a solid state. Problems of operation and inefficiency have, however, prevented the acceptance of such solid state reducing methods on a large commercial scale. The problem of breakage of the pellets during preheating and hardening steps has usually required that the pellets be prepared in an apparatus separate from a direct reduction apparatus, under carefully controlled conditions. The pellets are then reheated while transferring them to a direct reducer. Transferring pellets in any case subjects them to abrasive action and damage. The fragile nature of the pellets during direct reduction also causes problems in a reducing apparatus where pellets are conventionally rotated, rolled, or otherwise moved through a highly heated zone in large quantities, in which case the weight of the upper pellets in the mass results in breakage of pellets below. Even with breakage kept to a minimum, during exposure to the high temperatures needed for direct reduction, the surface of the pellets may flux and the pellets fuse together to form clumps or bunches which are difficult to separate and process.

Since the heat requirements for direct reduction of ores are high, any heat supplied must be effectively utilized in order to achieve economical processing. Indirect heating, such as by heating the exterior of a direct reduction apparatus, is expensive while the use of burners within a reducer for direct heating often results in diverse temperatures within various regions of the reducer and resulting hot spots.

The need thus exists for a process and apparatus for preheating, hardening and reducing pellets, such as iron ore pellets, where breakage or attrition of pellets is maintained at a relatively insignificant proportion throughout and where the pellets are economically and efficiently reduced. This invention is an improvement over the invention described in U.S. Pat. No. 3,585,023 issued June 15, 1971 by George A. Snyder and the present inventor, where the reduction of iron ore pellets is carried out by introducing pellets into a heat exchange medium of highly-heated, non-reactive solid particles.

SUMMARY OF THE INVENTION

In accordance with the present invention, pellets are continuously heat-processed through the stages of drying and preheating, hardening, and reduction with the pellets enveloped in inert particulate material throughout all stages of processing. Pellets are formed in a conventional apparatus and discharged into a first enclosure containing a fluidized bed where they are dried and preheated while being buoyantly moved through the enclosure. The dried, preheated pellets are then directly discharged into a second enclosure having a fluidized bed that is at a higher temperature than the first. The pellets are subjected to incipient hardening while buoyantly moved through the second enclosure and are then discharged into a columnar reactor where they are enveloped in a highly heated bed of inert particles for reduction. The mixture of pellets and inert material descends by gravity through the reactor where they are reduced and finally separated. When the pellets contain zinc oxide or other compounds of volatile metals, these metals can also be reduced in the columnar reactor and collected. The pellets are thus protected from any significant breakage or attrition throughout the heat processing and are continuously and efficiently processed.

BRIEF DESCRIPTION OF THE DRAWING

The drawing schematically illustrates an apparatus embodying the invention, and is also a flow diagram illustrating the present process.

DETAILED DESCRIPTION

As illustrated in the drawing, the apparatus includes a pelletizing apparatus and a fluidized bed type preheating and hardening furnace for pellets. The preheating fluidized bed furnace 2 comprises a horizontally disposed enclosure with fluidizing gas inlet lines 3 at the lower portion thereof and an inlet means 4 for charging hot finely divided inert solids into the enclosure. The charged fluidizing gas and finely divided inert solids make up the fluidized bed used in the preheater. Herein, the term fluidized bed is used in its conventional sense, that is, one in which a mass of finely divided solids is kept in a suspended state by a gas, the mass having a liquid-like mobility. The fluidizing gas inlets 3 are so arranged that in addition to suspending the finely divided solids, they provide translational movement of pellets within the fluidized bed preheater, whereby green pellets introduced through an inlet means 5 at one end of the enclosure are moved toward a discharge means 6 at the other end of the enclosure, the pellets being preheated during such transition. A screen or grid 7 extends across the lower portion of the enclosure 2 through which the fluidizing gas passes but which supports the finely divided solids and pellets. The finely divided inert solids used in the preheater are those which will form a fluidized bed and not react with the pellets, such as sand, alumina, silicon carbide, chrome-magnesite or other fine refractory material.

A mixture of iron oxide concentrate and carbonaceous fuel, which serves as a reducing agent, is mixed in pelletizer 8, such as a disc or drum pelletizer and the mixture formed in a conventional manner into green pellets. Generally, about 8–14 percent water is added to the mixture along with a binder, if required, and the mixture rolled into pellets or compacts. The iron oxide may be natural ore or ore concentrates in finely divided form; flue dust from basic oxygen furnaces; iron oxides from other sources or mixtures thereof. The reduction of pyrite roastings which contain various impurities such as zinc, copper, tin, arsenic, lead or sulfur can also be carried out according to the present invention, where about 3–5 percent calcium chloride or other halide is added to the pellets to react with these impurities. In such pyrite reduction, volatile metal compounds are formed and removed during the preheating and hardening stages. The carbonaceous fuel admixed with the iron oxides is coal, coke, anthracite, bituminous coal or other fossil fuel. A binder such as a coal tar pitch may also be added to the mixture to provide a strongly adhered pellet. The pelletizing apparatus and procedure used are well known and various modifications and changes in pelletizing specific iron oxides would, of course, be obvious to one skilled in the art.

From the pelletizer 8, pellets are moved through charging means 5, which contains a valve 5a, and introduced into the fluidized bed preheater 2. Since both the finely divided solids and the fluidizing gas are heated to a predetermined temperature sufficient to preheat the pellets, the fluidized bed acts as a heat transfer medium for preheating the pellets. In addition to providing rapid and complete preheating of the compacts, the fluidized bed provides a cushioning for the green pellets which are fragile and easily subject to breakage or attrition. The temperature of the fluidized bed preheater will vary depending upon the specific composition of the compacts and the presence or absence of water in the pellets, but for iron oxide pellets will generally be in the range of 400°–1200° F. The pitch or volatile tar ingredients and other volatile matter in the pellets, such as low temperature volatile metal impurities, are exhausted from the preheater 2 through an exhaust line 9 and the tar or other volatile matter separated in a cooler 10 before being discharged from the apparatus through line 11.

Adjacent the discharge end of the preheating furnace there is provided a fluidized bed furnace 12 for incipient hardening of the pellets. Fluidizing gas is fed to the horizontally disposed enclosure 12 through lines 13 and finely divided inert solids are introduced through inlet line 14 to provide the fluidized bed. A screen 15 is provided across the lower portion of the enclosure. An inlet means 16 to the furnace 12 is adjacent the discharge means 6 of the preheater and pellets from the preheater are transported to furnace 12 and then through the furnace to a discharge means 17 by the buoyant translational motion of the fluidized bed, similar to the movement of pellets through the preheater 2. The temperature within the fluidized bed 12 used for incipient hardening of the pellets, is for iron oxide pellets, maintained at about 1400°–1800°F., this temperature being sufficient to heat harden the pellets and carbonize the fuel contained therein, but below that at which significant reduction of iron oxide will take place. A non-oxidizing or only a slightly oxidizing atmosphere is maintained in the enclosure 12 so as to preserve the carbonaceous material in the pellets during the incipient hardening.

Pellets from the preheater 2, along with some carry-over finely divided solids from the preheater fluidized bed, are exhausted from the preheater through discharge means 6, which contains a screen or grid 18 for separation of the preheated pellets and the finely divided solids. The grid 18 is constructed such that the finely divided solids will pass through while the preheated pellets are supported and transferred therealong to the inlet means 16 of hardener 12. The finely divided solids passing through grid 18 are collected in an enclosed chamber 19 and returned by line 20 pneumatically, or by gravity flow or other means, to a fluidized bed reheating device 21 where the finely solids are reheated to a temperature of about 400°–1200°F. and used to replenish the supply of solids in the preheater 2. The preheated pellets are then charged into enclosure 12 through inlet means 16, where the pellets are suspended in the fluidized bed thereof and heated to 1400°–1800°F. while being transported threthrough. Off-gases from the enclosure 12 are exhausted through line 22 and can be used in a heat recuperator 23 for air preheating, steam generation, or the like, prior to being discharged through line 24 to the atmosphere. In the case of treatment of pyrite roastings, metal halides formed from halides which were added to the pyrites during pelletizing and the metals contained therein, would also be contained in the off-gases and would be removed in recuperator 23.

The discharge means 17 for removal of hardened pellets from the enclosure 12 contains a grid or screen 25 through which finely divided solids pass and which will separate the finely divided solids from the pellets. The finely divided solids are collected in a chamber 26 and returned by conduit 27 to the fluidized bed solids reheater 21.

The fluidized bed reheater 21 for heating of the finely divided solids used in the fluidized beds of the preheating and hardening furnaces is of conventional design and it is only schematically illustrated. As shown, two sections 28 and 29 are preferably provided, with the lower section 28 being used to preheat the solids to a higher temperature than the temperature of solids in section 29. An inlet 30 for gases is provided at the bottom of the cylindrically shaped reheater and there is a gas outlet 31 at the top. A grid or screen 32 is provided in the lower section 28 through which gases are passed, the grid holding a supply of finely divided solids 33. A second grid 34 is situated intermediate the two sections 28 and 29 of the reheater and holds a supply of finely divided solids 35 in the upper section 29. Two separate supplies of finely divided solids 33 and 35 are thus available for use in the two fluidized bed furnaces 2 and 12. Charging means 28a and 29a are provided to enable addition of make-up solids. Highly heated gases are charged to the reheater 21 from inlet line 30 through grid 32 which first heat the supply 33 to the desired temperature, preferably in the range of 1400°–1800°F. The gases which will be somewhat cooler after contact with supply 33 then are passed through grid 34 to heat the supply 35 to the desired temperature, preferably on the order of 400°–1200°F. A portion of the hot gases from lower section 28 of the reheater are discharged from the reheater 21, these gases being on the order of 1400°–1800°F., through line 36, which may contain a valve 37, or other regulating device, and are fed through inlets 13 of the enclosure 12, for use as fluidizing gas. At the same time, hot finely divided solids are carried through conduit 38 at a predetermined rate to replenish the supply of solids in the fluidized bed of enclosure 12. The gases through line 36 and the solids through conduit 38 are thus at the temperature required for incipient hardening of the pellets in the enclosure 12. While the fluidized bed is replenished in this manner, separated finely divided solids from enclosure 12 are returned to section 28 of preheater 21 through line 27 and inlet 39 to maintain the supply 33 of solids. A portion of the hot gases from the upper section 29 of the reheater 21 are discharged from line 31 through line 40 which contains a regulating valve 41 and are fed to the inlet lines 3 of the preheater 2. Also, solids from the upper section 29 of reheater 21 are charged to the inlet means 4 of the preheater 2 through conduit 42, the solids from conduit 42 and gases from line 40 providing the fluidized bed in the preheater 2. Finely divided separated solids from the preheater section pass through line 20 and are charged through inlet 43 to replenish the supply 35 in the upper section 29 of reheater 21. Residual off-gases from the reheater 21 are exhausted through line 44.

After the pellets have been transported through enclosures 2 and 12, wherein they have been preheated and incipiently hardened, the pellets are charged to a reduction reactor comprising a refractory lined vertical column 45. The reduction reactor is similar to the reactor described in U.S. Pat. No. 3,585,023. The column 45 has a mixing chamber 46 at the top into which pellets from discharge means 17 of the hardener 12 are introduced and an inclined grate 48 at the bottom portion. A feeder 47 such as a vibrator is provided in the column to assist in the flow of a solid mixture downwardly through the column 45.

The pellets are mixed in chamber 46 with hot inert particulate solids, which solids will not react with the iron oxides or other oxides present in the compacts. The inert solids which may be silicon carbide, sand, or other refractory material are heated to a temperature in the range of 1800°–2500°F. prior to being mixed with the compacts. Such mixture rapidly heats the compacts to reduction temperature while cushioning the compacts and maintaining individual compacts separate from others during gravity flow through the vertical reactor, the hot inert solids are charged to the reactor in an amount of about 4:1 to 8:1 weight ratio relative to the compacts, with preferably a ratio of about 5 to 1 being used.

The mixture descends by gravity in the reactor to the grate 48 that is constructed so as to allow the passage of hot inert solids such as sand therethrough but will support the pellets and lead the reduced pellets to a closed discharge chute 49 having a star valve or other lock device 50. A discharge chute 51 below the grate 48 carries the sand to an air lift furnace 52. Specifically, an air lift furnace 52, of known construction, comprises a refractory lined column 53 having a combustion zone 54 at its lower portion and means for charging air and fuel to the combustion zone illustrated as line 55 for air and line 56 for fuel, these being mixed and burned in a burner 57. The combustion gases are fed to the combustion zone and carry the sand up the column 53 to a hopper 58 at the top of the column. A discharge chute 59 is provided from hopper 58 leading to the top portion 46 of the reactor column, with a regulating device 60 provided to regulate the flow of hot sand to the mixing chamber 46 of column 45. The hot combustion gases from the air lift furnace, after deposition of the hot solids into hopper 58 are discharged through conduit 61 which carries the highly heated gases to line 30 for use in the fluidized bed reheater.

The reduced pellets are discharged through chute 49 by regulator 50 and introduced into a cooling tank 62 where they are cooled by contact with a non-oxidizing gas introduced through line 63. The non-oxidizing gas passes countercurrently to the descending reduced pellets in the cooler and is exhausted through line 64 to tuyeres 65 and into the reducer 45 where the gases flow countercurrently to the descending mixture and aid in the reduction of the pellets in the reactor 45. From the cooler 62, the reduced pellets are discharged through a discharge valve 66 and conduit 67 into a further cooling device such as a water cooled rotating drum 68 and then are discharged from the apparatus through chute 69.

The reduction is continuous, with preheated, incipiently hardened pellets and hot inert solids being mixed at the top of the reactor. The mixture descends by gravity with the rate of descent depending upon the amount of pellets in the mixture, the rate of removal and the contact time required for reduction. During the reduction, the reaction of the metal oxides in the pellets with the carbonaceous material present, as is well known, will produce carbon monoxide and water. When zinc oxides or other compounds of volatile metals are present in the hardened pellets, such as when pellets formed from BOF dust are being processed, the zinc oxide is also reduced and the zinc vapors carried off with the carbon monoxide gases. The off gases from reactor 45 are exhausted through a conduit 70 to a cooler 71 wherein volatile metals such as zinc are liquified. The condensed metal is collected in the cooler 71 and is periodically tapped through line 72. The carbon monoxide bearing gases flow from cooler 71 through line 73 to a condenser 74 where water carried by the off gases is condensed and removed. The carbon monoxide gases then pass through line 75 to a compressor 76. The residual, relatively clean carbon monoxide discharged from the compressor 76 flows through line 77 to a reformer 78, where, in conventional manner, carbon monoxide is catalytically reformed in the presence of steam supplied through line 79. Such reforming devices, where carbon monoxide and steam are reacted to produce hydrogen gas, are well known in the art. The reaction products from the reformer 78 flow to a pressure cooler 80 where associated carbon dioxide and water vapor are removed while the hydrogen gas is conducted through line 81 to the cooling tank 62 and subsequently into the reactor for use as a reductant.

From the foregoing it will be seen that the freshly-formed green pellets are dropped in continuous succession into an ebullient bed of finely-divided preheated solids into which hot gases are continuously circulated, so that the pellets avoid any severe shock as they fall into the bed and are buoyed or floated at random along the bed substantially out of contact with one another, so that they are preheated and dried without the breakage, deformation or attrition that occurs in other processes, such as in shaft furnaces, kilns, etc. After the initial preheating in this environment to a temperature of the order of 400°–1200°F. they are discharged from the opposite end of the preheater along with the particulate stream of fluidized particles in which they are moved. The particles are screened out, returned to the upper section 29 of the heater 21 to be reheated and recycled to the preheater, while the pellets, passing over the screen, enter the second fluidized bed unit where they are similarly enveloped in more highly-heated gases and buoyed by the second fluidized bed toward the discharge end, being hardened under the same protection against damage that they had in the preheater. Leaving the second fluidized bed at a temperature between 1400°F. and 1800°F., they are now hard enough and sufficiently bonded to endure the reducing operation in the columnar reactor. As in the preceding fluidized bed unit, the discharge from the second unit is screened with the pellets discharging in continuous procession into the top of the columnar reactor and the screenings are transferred to the lower portion 28 of the heater 21 to be heated and recycled to the second fluidized bed.

At the top of the reactor the hot pellets are enveloped in the still more highly-heated fine particles which are also discharging continuously into the top of the reactor, so that the pellets are for the most part arranged at random and separated one from another while they are heated to reduction temperature. Reduction of the pellets takes place while they are randomly separated, through heating the carbonaceous material-containing pellets to reducing temperature. They descend with the hot particulate material preferably countercurrent to hydrogen or other reducing gas introduced into the column through a bustle pipe and tuyeres 65. This reducing gas, having been used to cool the pellets in cooling unit 62, assists in the usual reducing reaction, with the pellets being converted principally to metal, but without deformation or bunching. The gaseous reaction products are removed near the top of the column. Since the pellets are embedded in and enveloped by the surrounding hot particles, they are more uniformly heated across the section of the column than is the case with shaft furnaces or with traveling grates. While there is of course an increasing pressure in the mass downwardly in the column, the pressure is not concentrated in the pellets as is the case in a shaft furnace, for example, where a pellet theoretically makes only point contact with a pellet or pellets below it, placing them under severe crushing pressures.

I claim:

1. Apparatus for the continuous heat processing of pellets, characterized by the cushioning of the pellets during preheating and incipient hardening to minimize breakage or attrition, wherein the pellets are enveloped in inert particulate material at all stages of processing comprising:
   a. a pellet-forming apparatus,
   b. a first enclosure containing a fluidized bed of solid particles of inert material arranged to continuously receive green pellets and buoyantly move them to a point of discharge with means for maintaining the fluidized bed at an elevated temperature to preheat and dry the pellets as they are carried to the point of discharge,
   c. a second enclosure containing a fluidized bed similar to the first into which the dry preheated pellets from the first unit are directly discharged, said second enclosure having means for maintaining the fluidized bed at a temperature higher than the first to effect incipient hardening of the pellets,
   d. means for charging fluidized gas to each of said enclosures so arranged as to direct the movement of the pellets through said enclosures,
   e. a columnar reactor arranged to continuously receive hardened pellets directly from said second enclosure at its upper end, said reactor having means for continuously supplying highly-heated inert particulate material into the upper end thereof to envelop the pellets as they are discharged into the upper end thereof, and
   f. means at the bottom of the reactor for continuously removing and separating pellets and particulate material to effect a continuous downward movement of the pellets and particulate material through the column at a controlled rate,
   g. said apparatus thereby effecting the processing of the pellets continuously while they are randomly enveloped in and separated by hot inert particulate material.

2. Apparatus for the continuous heat-processing of pellets wherein the pellets are enveloped in inert particulate material at all stages of processing as defined in claim 1 including means for separating dried and preheated pellets from said solid particles of inert material discharged from said first enclosure prior to charging of said pellets into said second enclosure.

3. Apparatus for the continuous heat-processing of pellets wherein the pellets are enveloped in inert particulate material at all stages of processing as defined in claim 2 including means for reheating and returning said separated inert material for recycle to said first enclosure.

4. Apparatus for continuous heat-processing of pellets wherein the pellets are enveloped in inert particulate material at all stages of processing as defined in claim 2 including means for separating hardened pellets from solid particles of said fluidized bed discharged from the second enclosure prior to envelopment of said pellets in said columnar reactor.

5. Apparatus for continuous heat-processing of pellets wherein the pellets are enveloped in inert particulate material at all stages of processing as defined in claim 5 including means for reheating and returning said separated solid particles of said fluidized bed of the second enclosure for recycle to said second enclosure.

6. Apparatus for continuous heat-processing of pellets wherein the pellets are enveloped in inert particulate material at all stages of processing as defined in claim 1 including means for charging a reducing gas to the lower portion of said columnar reactor for countercurrent flow to said movement of pellets and particulate material.

7. Apparatus for continuous heat processing of pellets wherein the pellets are enveloped in inert particulate material at all stages of processing as defined in claim 1 including means for exhausting gases from said columnar reactor and means for cooling said exhaust gases to remove volatile metals present therein.

8. Apparatus for use in the manufacture of pellets containing agglomerated mineral particles comprising:
   a. a pelletizing unit for continuously forming moist green pellets,
   b. an enclosure into which the moist green pellets are discharged by gravity, said enclosure containing a fluidized bed of heated finely-divided inert particulate material to cushion the pellets as they gravitate into the enclosure and through which they become randomly distributed,
   c. means for continuously progressing said bed from one end of the enclosure toward the other while maintaining the bed in a heated condition and discharging the material and pellets from the other end, whereby the pellets are dried and preheated while buoyed in said bed,
   d. means for separating the preheated and dried pellets from the particulate material upon discharge at said other end, and
   e. means for heating and recycling the separated particulate material to the end of said enclosure into which the moist green pellets are discharged.

9. Apparatus for use in the manufacture of pellets containing agglomerated mineral particles as defined in claim 8 including:
   a. a second enclosure containing a fluidized bed of heated finely-divided inert particles,
   b. means for transferring dried and preheated pellets from the first enclosure directly to said second enclosure,
   c. the fluidized bed of said second enclosure being at a temperature several hundred degrees higher than the fluidized bed in said first enclosure wherein the preheated and dried pellets are continuously enveloped and buoyed in the fluidized bed of the second enclosure in random distribution from the end into which the pellets are transferred from the first enclosure to the other end from which the pellets are discharged to harden the pellets for further processing.

* * * * *